United States Patent
Altheimer et al.

(10) Patent No.: US 8,888,281 B2
(45) Date of Patent: Nov. 18, 2014

(54) METHOD AND SYSTEM FOR OPTIMIZING A SPECTACLE LENS BASED ON INDIVIDUAL PARAMETERS OF A WEARER

(75) Inventors: Helmut Altheimer, Baisweil-Lauchdorf (DE); Wolfgang Becken, Munich (DE); Gregor Esser, Munich (DE); Dietmar Uttenweiler, Icking (DE); Martin Zimmermann, Erdweg-Kleinberghofen (DE)

(73) Assignee: Rodenstock GmbH, Munich (DE)

( * ) Notice: Subject to any disclaimer, the term of this patent is extended or adjusted under 35 U.S.C. 154(b) by 827 days.

(21) Appl. No.: 13/023,335

(22) Filed: Feb. 8, 2011

(65) Prior Publication Data

US 2012/0203368 A1 Aug. 9, 2012

(51) Int. Cl.
*G02C 7/02* (2006.01)
*G02C 7/06* (2006.01)

(52) U.S. Cl.
CPC ............... *G02C 7/065* (2013.01); *G02C 7/028* (2013.01); *G02C 7/027* (2013.01)
USPC .................................. 351/159.76; 351/159.77

(58) Field of Classification Search
USPC ........................... 351/159.75, 159.76, 159.77
See application file for complete search history.

(56) References Cited

U.S. PATENT DOCUMENTS 2,149,148 A * 2/1939 Rones ........................... 351/203
2012/0147324 A1* 6/2012 Marin et al. .............. 351/159.76

* cited by examiner

*Primary Examiner* — Scott J Sugarman
(74) *Attorney, Agent, or Firm* — Schiff Hardin LLP

(57) ABSTRACT

A method, a system and a computer program product are provide for optimizing a spectacle lens for a wearer with a selectable quality grade. In particular, a set of individual parameters is determined for the wearer and a desired quality grade is identified. Depending the identified quality grade, the set of individual parameters is adapted and a surface of the spectacle lens is calculated based on the adapted set of individual parameters.

18 Claims, 14 Drawing Sheets

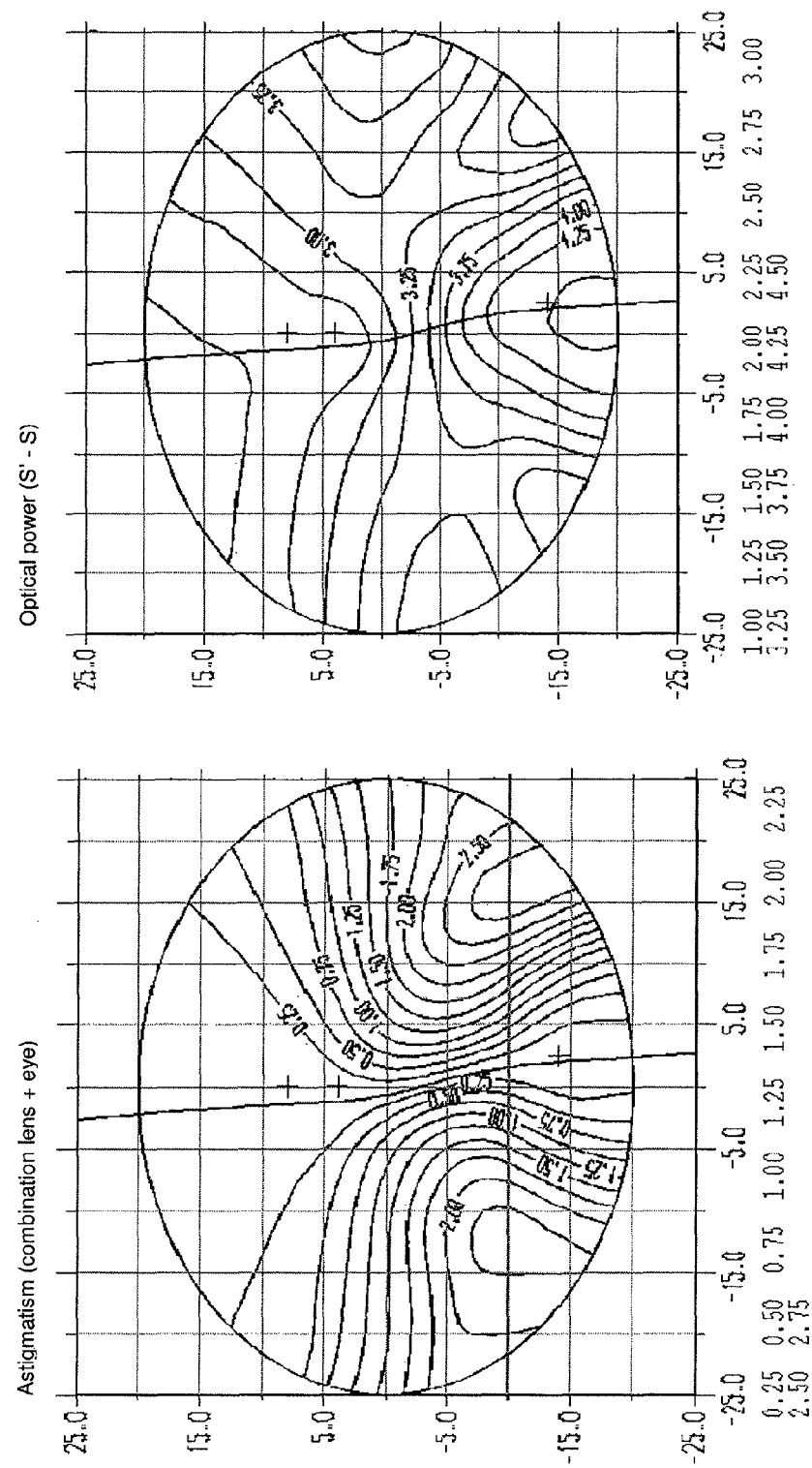

METHOD AND SYSTEM FOR OPTIMIZING A SPECTACLE LENS BASED ON INDIVIDUAL PARAMETERS OF A WEARER

The preferred embodiments described herein relate to an individual optimization of a spectacle lens, particularly a progressive spectacle lens, for a spectacle wearer. In one aspect, the optimization allows to individually select or control a variety, for example a continuum, of grades of quality of the optical image formation depending on the spectacle wearer's preferences.

BACKGROUND

Progressive spectacle lenses and the individual optimization of aberrations of progressive spectacle lenses were described in many publications. For most applications, the general aim was the best improvement of the quality of image formation, i.e. reducing aberrations as far as possible. The highest qualities are presently achievable with spectacle lenses that are optimized individually for a particular wearer with the individual preferences of use being taken into account. For these spectacle lenses, the design of the spectacle lenses (i.e. the distribution of the effective power and astigmatism) are adapted to the individual needs of the wearer. When minimizing the aberrations of a spectacle lens, all individual prescription data (spherical power, cylindrical power, cylinder axis, prism, prism base, addition) as well as the individual data of wear (vertex distance HSA, pantoscopic angle, face form angle, interpupillary distance) and additionally, even the object distance in the reference points are taken into account.

When adapting the dioptric power to the ordered prescription of the wearer, conventionally only two different procedures were available:

1) Conventional Prescription Surface

In this procedure, a surface with a simple mathematical representation, such as a toric surface, is calculated for the rear surface (in spectacle lenses based on conventional blanks) or as a surface to be superimposed to a progressive base surface (in simple progressive additional lenses with a progressive rear surface fabricated according to free-form technology) such that the prescribed effect is met in the optical reference point. Available individual data of the wearer (e.g. position of wear) may be taken into account. No surface optimization is carried out.

2) Individually Optimized Prescription Surface

An optimization of the entire surface is carried out while the individual data of the prescription as well as data of the position of wear are taken into account. As far as the individual data of the position of wear are available, these data are taken into account for the optimization. Otherwise standardized data are used. In any case, all available parameters are used in order to achieve the best possible spectacle lens. The calculated and optimized surface is typically the rear surface, while the front surface may be a single vision surface (i.e. spheric, aspheric, or toric surface) or a progressive surface.

All conventionally proposed methods of optimization aim at the best possible improvement of the quality of image formation through consideration of all available parameters. Since the launch of the product "Impression" by Rodenstock in the year 2000, more and more companies try to make use of the so-called free-form technology in own products. Not least because of the great success of "Impression", the spectacle lenses with a spherical front surface and a progressive-astigmatic rear surface are considered as first grade for correcting presbyopia. However, many of those spectacle lenses fabricated with the free-form technology are not individually optimized, but their optical correction quality is similar to lenses based on conventional blanks with a progressive front surface (base curve) and a spherical or toric prescription surface. The only difference is that for the optimization and fabrication of many of those conventional spectacle lenses fabricated with the free-form technology the simple prescription surface is superimposed to a progressive base surface. Similar to glasses based on conventional blanks, for each mean spherical power a progressive base surface is calculated and stored as a base design for each glass material, each addition, and each progression length in advance. The typical range of spherical power covered by a single base surface is about 3 dpt. Therefore, about 6 base designs are required in order to cover the normal range of the spherical power between about −10 dpt and +10 dpt.

For a product family with three progression lengths, five materials, and twelve additions (0.75 dpt to 3.5 dpt) at least 6*3*5*12=1080 base designs have to be calculated and stored in advance. Moreover, for positive lenses at least two (better three) base designs should be provided for different glass diameter, since the centre thickness of positive lenses depends on the diameter of the glass, and at higher surface curvature of the front surface the addition strong varies with the surface curvature. Therefore, a reasonable conventional approaches base on the free-form technology require about 1500 to 2000 base designs.

These base designs are calculated and stored on a computer in advance. Subsequently, a simple superposition surface is added to the progressive rear surface in order to meet the required prescription in the reference point. These glasses have implemented the progression on the rear surface (i.e. the eye side surface) and they are manufactured with the free-from technology. However, since no power-dependent optimization was carried out and since none of the individual parameter of wear are taken into account for the surface optimization, the optical quality, i.e. the quality of image formation, of these spectacle lenses compares to that of conventional lenses based on blanks. Therefore, these spectacle lenses also have the known deficiencies of the conventional blank products. Although manufacture of these lenses is equally costly as for progressive spectacle lenses that are fully individually optimized online, the optical properties may significantly deviate from the target value of the base design, particularly for astigmatic prescriptions and/or prismatic prescriptions and/or deviating individual parameters and/or extreme diameters of the glasses. Therefore, these spectacle lenses from the lower price range within the branded progressive lenses.

On the other hand, if the presently most sophisticated optimization process is applied (individual online optimization, flexible optimizer, scaling of the astigmatic target value, automatic design modification), only about 5 start designs are required to provide optimal image formation of the spectacle lens with any design for all additions, material, progression lengths, base curves, individual parameters of wear, and prescriptions. These spectacle lenses, therefore, represent the top-quality products for the spectacle wearer.

SUMMARY

In one aspect, it is desired to be able to provide a variety of intermediate grades of quality that could be offered in a respective variety of price ranges. In another aspect, it is desired to provide a system and a method for a simple ordering and manufacturing of spectacle lenses with a variety or even a continuum of grades of quality individually selectable for each spectacle wearer.

According to one aspect, a method of optimizing a spectacle lens for a wearer is provided for a subsequent manufacturing of the spectacle lens. The method comprises determining a set $h_{id}$ of individual parameters for the wearer. These parameters may also be called ideal parameters. Moreover, the method comprises identifying a quality grade. The quality grade may be a degree of quality which the spectacle wearer wants to achieve for the desired spectacle lens. It may be identified based on a user's selection. The user, particularly the spectacle wearer or an ophthalmologist, may select the desired quality grade from a series of predetermined values or the desired quality grade may be arbitrarily selected within a given range (i.e. a continuum) of quality grades. Furthermore, the method comprises adapting the set of individual parameters depending on the identified quality grade to establish an adapted set $h_{opt}$ of parameters, and calculating the spectacle lens, in particular a surface of the spectacle lens, such as the rear surface, for example, based on the adapted set $h_{opt}$ of individual parameters.

The set $h_{id}$ of individual parameters may comprise individual prescription data and individual data of wear, wherein the individual prescription data may comprise individual parameters with respect to the spectacle wearer's visual defect, while the individual data of wear may comprise individual parameters with respect to the spectacle wearer's individual situation or position of wear such as the position of the spectacle lens in front of the wearer's eye. In particular, the individual prescription data may comprise one or more parameters out of the group of parameters comprising individual prismatic prescription data, i.e. the amount and orientation (base) of an individual prismatic prescription, individual spherical prescription data, and individual astigmatic prescription data, i.e. the prescribed astigmatic effect and the axis, for example. The individual data of wear may comprise one or more parameters out of the group of parameters comprising an individual interpupillary distance, an individual vertex distance (also called cornea-vertex distance), an individual pantoscopic angle, and an individual face form angle, for example.

Accordingly, the determined set $h_{id}$ of individual parameters for the wearer may comprise individual prismatic prescription data (prism and/or base); and/or individual spherical prescription data; and/or individual astigmatic prescription data (astigmatic effect and axis); and/or an individual interpupillary distance; and/or an individual vertex distance; and/or an individual pantoscopic angle; and/or an individual face form angle. Analogously, the adapted set $h_{opt}$ of individual parameters may comprise modified individual prismatic prescription data; and/or modified individual spherical prescription data; and/or modified individual astigmatic prescription data; and/or a modified individual interpupillary distance; and/or a modified individual vertex distance; and/or a modified individual pantoscopic angle; and/or a modified individual face form angle.

Depending on the identified quality grade, at least one of the modified parameters in the adapted set $h_{opt}$ of individual parameters may differ from the respective parameter in the determined set $h_{id}$ of individual parameters for the wearer. In one example, one or more of the parameters in the adapted set $h_{opt}$ of individual parameters may be identical to the respective parameters in the determined set $h_{id}$ of individual parameters for the wearer. In one example, the determined set $h_{id}$ of individual parameters for the wearer and/or the adapted set $h_{opt}$ of individual parameters may comprise predetermined, in particular user independent, standard parameters such as standardized data of wear (i.e. mean values that are used for many spectacle wearer but not individually determined). In particular, in this example, some of the data of wear may be individually determined data of wear, while other data of wear may be retrieved from a database storing standardized values. In a particular example, adapting the set of individual parameters may comprise replacing one or more individually determined parameters by a respective predetermined standard parameter.

In one aspect, the set $h_{id}$ of individual parameters may be determined independent of the desired quality grade. In particular, the set $h_{id}$ of individual parameter may be measured for the individual spectacle wearer and may be entered in a computer system via an appropriate interface in the same manner for any desired quality grade. At the same time or subsequently, for example, the desired quality grade may be selected for the individual spectacle wear and may also be entered in the computer system via said interface. The set $h_{id}$ of individual parameters and the selected quality grade may then be transferred to a computation component for calculating and optimizing at least one surface of the desired spectacle lens based on the collected and transmitted data. The unified collection and transmission of individual data for the wearer independent of the desired quality grade can significantly simplify the process of ordering a spectacle lens. In particular, the user, such as an ophthalmologist, does not have to care about the finally desired quality of grade at the time of collecting (e.g. measuring) and transmitting all individual data for the spectacle wearer. The user does not need to adapt or select the required data depending on the quality grade. Instead, the adaptation of a set of data may be automatically performed by the computation component. Moreover, a single unified interface for entering and transmitting the individual data for the spectacle wearer can be applied independent of the desired quality grade.

Calculating the surface of the spectacle lens may comprise optimizing a surface shape by minimizing a target function based on the adapted set $h_{opt}$ of individual parameters. The at least one surface of the spectacle lens may then be established by superimposing a prescription surface and the optimized surface shape, wherein the spectacle lens meets the user's prescription in at least one reference point of the spectacle lens. The superimposed prescription surface may be provided as a toric surface. It may be provided such that after the superposition of the two surface forms, the spectacle lens meets the user's prescription in at least one reference point of the spectacle lens, such as a far vision reference point and/or a prism reference point and/or a near vision reference point, for example.

Adapting the set of individual parameters may comprise establishing a measure of quality based on a deviation of the adapted set $h_{opt}$ of individual parameters from the set $h_{id}$ of individual parameters determined for the wearer; and deriving the adapted set $h_{opt}$ of individual parameters such that the measure of quality meets the identified quality grade.

In one particular example, the measure of quality S may be established as a continuous function $S=g(h_{opt}-h_{id})$ of the difference $(h_{opt}-h_{id})$ between an adapted parameter vector $h_{opt}$, which contains the adapted set of parameters as its components, and a parameter vector $h_{id}$ for the spectacle wearer, which contains the set of parameters determined for the spectacle wearer as its components.

In order to provide any desired intermediate grade of quality and, thus, a product at any intermediate prize level, an online optimization (i.e. an individual optimization for the specific wearer) may be carried out. However, the parameters for the wearer may be adapted and/or selected in accordance with the desired grade of quality. In particular, the adaptation and/or the selection of the wearer's parameters may be made automatically taking the desired grade of quality into account. The wearer's parameters that may be at least partly adapted and/or from which the parameters considered for the optimization may be selected, may comprise prescription data and/or individual parameter for the position of wear and/or design parameters.

Therefore, the optimization of the spectacle lens may be carried out in two steps. In a first step, a surface optimization (calculation of the full surface) is carried out for the adapted parameters. In a second step, a simple prescription surface is superimposed to the calculated surface such that the ordered dioptric effect for the wearer is achieved in the reference point. Available individual parameters may be taken into account, but they do not necessarily be taken into account.

In order to quantitatively describe the grades of quality, the spectacle wearer's prescription data for the x-component of the prism $Pr_x$, the y-component of the prism $Pr_y$, sphere S, cylinder Z, and cylinder axis A are identified by the index "id" in the following:

$$Pr_{x,id}, Pr_{y,id}, S_{id}, Z_{id}, A_{id}$$

The data actually used in the optimization are identified with the index "opt":

$$Pr_{x,opt}, Pr_{y,opt}, S_{opt}, Z_{opt}, A_{opt}$$

Analogously, the spectacle wearer's individual parameters for the situation (or position) of wear, including the vertex distance HSA (also called cornea-vertex distance), the pantoscopic angle $\phi_x$, the face form angle $\phi_y$, and the interpupillary distance PD, are identified by the index "id":

$$PD_{id}, HSA_{id}, \phi_{x,id}, \phi_{y,id}$$

The respective data actually used in the optimization are identified with the "opt":

$$PD_{opt}, HSA_{opt}, \phi_{x,opt}, \phi_{y,opt}$$

The quality may be graded higher if the deviation between the "opt"-values and the "id"-values is lower. An efficient description of this deviation may be achieve by combining the parameters in respective vectors. For the sphere, the cylinder, and the axis it may be particularly efficient to use the so-called power vector, which is defined as $$\begin{pmatrix} M \\ J_0 \\ J_{45} \end{pmatrix} = \begin{pmatrix} S + \frac{Z}{2} \\ -\frac{Z}{2}\cos 2A \\ -\frac{Z}{2}\sin 2A \end{pmatrix} \quad (1)$$

As a prescription vector p the following vector having no unit is introduced:

$$p = \begin{pmatrix} Pr_x / (\text{cm/m}) \\ Pr_y / (\text{cm/m}) \\ M / dpt \\ J_0 / dpt \\ J_{45} / dpt \end{pmatrix} \quad (2)$$

Moreover, a parameter vector g (without units) is introduced that describes parameters of the user's situation of wear:

$$g = \begin{pmatrix} PD / \text{mm} \\ HSA / \text{mm} \\ \varphi_x / \text{degree} \\ \varphi_y / \text{degree} \end{pmatrix} \quad (3)$$

There two vectors p and g may be combined to a 9-component vector h as follows:

$$h = \begin{pmatrix} p \\ g \end{pmatrix} = \begin{pmatrix} Pr_x / (\text{cm/m}) \\ Pr_y / (\text{cm/m}) \\ M / dpt \\ J_0 / dpt \\ J_{45} / dpt \\ PD / \text{mm} \\ HSA / \text{mm} \\ \varphi_x / \text{degree} \\ \varphi_y / \text{degree} \end{pmatrix} \quad (4)$$

The vector h may extended by further components which may represent additional individual parameters, such as parameters for a specific spectacle frame, for example.

In one example, the highest grade of quality may be characterized by $h_{opt}=h_{id}$, wherein the vectors $h_{opt}$ and $h_{id}$ are defined via equations (1), (2), (3), and (4) with respective indices "id" and "opt" being added. A measure of quality, i.e. a measure of the deviation of quality from highest quality grade, may be determined based on the deviation $h_{opt}-h_{id}$. Since $h_{opt}-h_{id}$ is a vector, a scalar S may be derived from $h_{opt}-h_{id}$ as a measure of quality.

In one example, the absolute value may be determined as the quality grade:

$$S = |h_{opt} - h_{id}| \quad (5)$$

A generalization of the measure of quality may attained from the fact that for each given measure of quality. S and for each monotone function $f(x)$ that maps the positive real numbers onto itself, the quantity $$f(S) \quad (6)$$

may also be considered as a measure of quality that is equivalent to S in the sense that two glasses belong to the same value of $f(S)$ if and only if they belong to the same value of S.

Even more generally, S may be an arbitrary scalar function of the vector $h_{opt}-h_{id}$:

$$S = g(h_{opt} - h_{id}) \quad (7)$$

wherein the function g is selected such that S=0 for $h_{opt}=h_{id}$, and S≥0 for $h_{opt} \neq h_{id}$. Thereby, S is a measure of quality that has an extremum (S=0) for an optimization with the ideal parameters, and non-negative values otherwise. In one example, the number S may be the higher the lower the quality is and vice versa.

In one example, the measure of quality may be established as $$S = \frac{1}{2}(h_{opt} - h_{id})^T A(h_{opt} - h_{id})$$

with $$A_{ij} = \left.\frac{\partial^2 g}{\partial h_i \partial h_j}\right|_{h=0}$$

being the Hessian of the continuous function $S=g(h_{opt}-h_{id})$. In particular, for the case that the function in equation (7) is developed in a Taylor series, the most important properties of the function g and thus the measure of quality S may be characterized by parameters. The Taylor expansion up to the second order reads $$g(h) = g(0) + \sum_{i=1}^{9} \left.\frac{\partial g}{\partial h_i}\right|_{h=0} h_i + \frac{1}{2}\sum_{i=1}^{9}\sum_{i=1}^{9} \left.\frac{\partial^2 g}{\partial h_i \partial h_j}\right|_{h=0} h_i h_j + O(h^3) \quad (8)$$

In case S=0 at $h_{opt}=h_{id}$ it follows that g(0)=0. Moreover, the extremum of S at $h_{opt}=h_{id}$ may go along with a vanishing gradient of g $$\left(\text{i.e. } \left.\frac{\partial g}{\partial h_i}\right|_{h=0} = 0\right)$$

such that the first two terms for g in equation (8) vanish. With the symmetric 9×9-matrix A of the second deviations of g, known as Hessian, wherein $$A_{ij} = \left.\frac{\partial^2 g}{\partial h_i \partial h_j}\right|_{h=0} \quad (9)$$

a general form of S in the second order is given by $$S = \frac{1}{2}\sum_{i=1}^{9}\sum_{i=1}^{9} A_{ij}(h_{opt,i} - h_{id,i})(h_{opt,j} - h_{id,j}) \quad (10)$$

$$= \frac{1}{2}(h_{opt} - h_{id})^T A(h_{opt} - h_{id})$$

In one aspect, an advantage of equation (10) may be that the measure of quality S does not need to be described via the function g but it can be directly defined with the matrix A. The symmetric 9×9-matrix has 45 independent components. Thus, in the second order Taylor expansion of equation (8) the definition of the measure of quality S requires to define 45 free parameters. However, these parameter are not defined completely arbitrarily. Instead, it may be desirable, that $h^T A h \geq 0$ for all vectors h (such matrices are known as positive semidefinite). A criterion for these matrices is that all eigenvalues of A are non-negative. For most cases it may be particularly efficient to set a plurality (or even most) of the parameters of A to zero. Consequently, vectors $h \neq 0$ may exist with Ah=0. These vectors h form the so-called null space of A.

An asymmetry of A does not lead to a further generalization of equation (10), since for a asymmetric matrix A equation (10) remains unchanged if A is replaced by symmetric form $(A+A^T)/2$, wherein $A^T$ is the transpose of A. In one aspect, the implementation is not limited to equation (8) or (10), since not every function applied for the implementation can be expanded in a Taylor series. In particular, the absolute value $S=|h_{opt}-h_{id}|$ (equation (5)) can not be expanded in a Taylor series. Together with equation (6), however, the absolute value can be derived based on equation (10), wherein $A=2\cdot 1$ and $f(x)=\sqrt{x}$:

$$|h_{opt} - h_{id}| = f\left(\frac{1}{2}(h_{opt} - h_{id})^T A(h_{opt} - h_{id})\right) \quad (11)$$

$$= \sqrt{\frac{1}{2}(h_{opt} - h_{id})^T 2 \cdot 1 (h_{opt} - h_{id})}$$

$$= \sqrt{(h_{opt} - h_{id})^T (h_{opt} - h_{id})}.$$

In the following, examples for the measure of quality are given. In one example, the set of individual parameters may comprise the components of the power vector $$\begin{pmatrix} M \\ J_0 \\ J_{45} \end{pmatrix} = \begin{pmatrix} S + \frac{Z}{2} \\ -\frac{Z}{2}\cos 2A \\ -\frac{Z}{2}\sin 2A \end{pmatrix}$$

defined for the sphere S, the cylinder Z, and cylinder axis A, wherein the applied measure of quality may be proportional to $[(M_{opt}-M_{id})^2+(J_{0,opt}-J_{0,id})^2+(J_{45,opt}-J_{45,id})^2]$.

In particular, this example may be represented by $$A = \begin{pmatrix} 0 & 0 & 0 & 0 & 0 & 0 & 0 & 0 & 0 \\ 0 & 0 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{pmatrix} \quad (9a)$$

This may result in:

$$S = \frac{1}{2}\left(\frac{1}{dpt}\right)^2 [(M_{opt} - M_{id})^2 + (J_{0,opt} - J_{0,id})^2 + (J_{45,opt} - J_{45,id})^2], \quad (10a)$$

Thus, according to this example the measure of quality may be proportional to the dioptric distance between the ideal prescription data of the second order and the modified prescription data of the second order that are used for the optimization process. The null space of A includes all vectors h that have only components defining the prism or individual parameters of position of wear. Thus, if the modified data and the ideal data differ only in parameters corresponding to prism or individual parameters of the position of wear, then $h_{opt}-h_{id}$ is in the null space of A with $A(h_{opt}-h_{id})=0$, such that S=0, and the deviation of the modified data from the ideal data does not contribute to a considered degradation of quality.

In another example the set of individual parameters may comprise a horizontal prism component $Pr_x$ and a vertical prism component $Pr_y$, and the applied measure of quality may be proportional to $[(Pr_{x,opt}-Pr_{x,id})^2+(Pr_{y,opt}-Pr_{y,id})^2]$.

This example may be particularly represented by $$A = \begin{pmatrix} 1 & 0 & 0 & 0 & 0 & 0 & 0 & 0 & 0 \\ 0 & 1 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{pmatrix} \quad (9b)$$

This may result in:

$$S = \frac{1}{2}\left(\frac{m}{cm}\right)^2 [(Pr_{x,opt} - Pr_{x,id})^2 + (Pr_{y,opt} - Pr_{y,id})^2] \quad (10b)$$
$$= \frac{1}{2}\left(\frac{m}{cm}\right)^2 |pr_{opt} - pr_{id}|^2$$

Thus, according to this example the measure of quality may be proportional to the square of the absolute value of the vector difference between the prism vectors $$pr_{opt} = \begin{pmatrix} Pr_{x,opt} \\ Pr_{y,opt} \end{pmatrix}, \ pr_{id} = \begin{pmatrix} Pr_{x,id} \\ Pr_{y,id} \end{pmatrix}$$

of the ideal prescribed prism and the modified prescribed prism that is used for the optimization process. The null space of A includes all vectors h that have only components defining the prescription data of the second order or individual parameters of the position of wear, so that deviations in these components do not contribute to a considered degradation of quality.

In yet another example, the set of individual parameters may comprise a pantoscopic angle $\phi_x$ and a face form angle $\phi_y$, and the applied measure of quality may be proportional to $[w_x\cdot(\phi_{x,opt}-\phi_{x,id})^2+w_y\cdot(\phi_{y,opt}-\phi_{y,id})^2]$ with weighting parameters $w_x$ and $w_y$.

In particular, this example may be represented (in one preferred example with $w_x=1$ and $w_y=5$) by $$A = \begin{pmatrix} 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 1 & 0 \\ 0 & 0 & 0 & 0 & 0 & 0 & 0 & 0 & 5 \end{pmatrix} \quad (9c)$$

This may result in:

$$S = \frac{1}{2}\left(\frac{1}{Grad}\right)^2 [(\varphi_{x,opt} - \varphi_{x,id})^2 + 5(\varphi_{y,opt} - \varphi_{y,id})^2] \quad (10c)$$

Thus, according to this example the measure of quality may be proportional to the weighted sum of the squares of the deviations in the pantoscopic angle and the face form angle, wherein due to its greater influence on the performance, the square of the deviation in the face form angle is weighted by the factor 5. The null space of A includes all vectors h that have only components defining the prescription data, the interpupillary distance, or the vertex distance.

In yet another example, the set of individual parameters may comprise a mean optical power $$M = S + \frac{Z}{2}$$

defined for the sphere S and the cylinder Z, a pantoscopic angle $\phi_x$, and a face form angle $\phi_y$, and the applied measure of quality may be proportional to $$\left[ w_{MM} \cdot \left(\frac{M_{opt} - M_{id}}{dpt}\right)^2 + w_{\varphi\varphi} \cdot \left(\frac{\varphi_{y,opt} - \varphi_{y,id}}{degree}\right)^2 + w_{M\varphi}\left(\frac{M_{opt} - M_{id}}{dpt}\right)\left(\frac{\varphi_{y,opt} - \varphi_{y,id}}{degree}\right) \right]$$

with weighting parameters $w_{MM}$, $w_{\varphi\varphi}$, and $w_{M\varphi}$.

In particular, this example may for the special values $w_{MM}=1$, $w_{\varphi\varphi}=3$, $w_{M\varphi}=1$ be represented by $$A = \begin{pmatrix} 0 & 0 & 0 & 0 & 0 & 0 & 0 & 0 & 0 \\ 0 & 0 & 0 & 0 & 0 & 0 & 0 & 0 & 0 \\ 0 & 0 & 1 & 0 & 0 & 0 & 0 & 0 & 1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 1 & 0 & 0 & 0 & 0 & 0 & 3 \end{pmatrix} \quad (9d)$$

Thus, in this example the measure of quality $$S = \frac{1}{2}\left(\frac{M_{opt} - M_{id}}{dpt}\right)^2 + \frac{3}{2}\left(\frac{\varphi_{y,opt} - \varphi_{y,id}}{degree}\right)^2 + \left(\frac{M_{opt} - M_{id}}{dpt}\right)\left(\frac{\varphi_{y,opt} - \varphi_{y,id}}{degree}\right) \quad (10d)$$

measures deviations in the mean optical power M as well as in the face form angle $\phi_y$. If for the optimization the modified mean optical power is shifted to higher values ($M_{opt}-M_{id}>0$) and at the same time the face form angle in the modified data is shifted to higher values ($\phi_{y,opt}-\phi_{y,id}>0$) or if both parameters are shifted to lower values ($M_{opt}-M_{id}<0$ and $\phi_{y,opt}-\phi_{y,id}<0$), then the considered grade of quality is decreased, i.e. the considered quality is degraded. On the other hand, if the sign of $M_{opt}-M_{id}$ and $\phi_{y,opt}-\phi_{y,id}$ are opposite to each other, then the considered grade of quality is increased, i.e. the considered quality is upgraded.

The measure of quality S serves for evaluating and grading the performed optimization at given ideal data and modified data. In order to determine the modified data for the optimization, it is desired to provide a functional prescription that allows to determine the modified data at given ideal data. Such a functional prescription may read as:

$$h_{opt} = h_{opt}(h_{id}) \quad (12)$$

Several examples for the implementation of this function are given in the following. A first example may be represented by a constant $$h_{opt}(h_{id}) = h_0 = \text{const.} \quad (12a)$$

In this example equation (10) may result in $$S = \frac{1}{2}(h_0 - h_{id})^T A(h_0 - h_{id}) \quad (13a)$$

so that the best quality S=0 is achieved only for a single case, i.e. for a specific spectacle wearer, whose true or ideal data take the values defined by the constant $h_{id} = h_0$. In other cases, i.e. for different ideal data, $S \geq 0$ and the spectacle lens does possibly not have the best grade of quality. Only if A has a null space, spectacle lenses may be made that achieve the best grade of quality (S=0) even in case of $h_0 - h_{id} \neq 0$. This may be particularly the case if A is chosen in accordance with equation (9a), for example, i.e. only deviations in the refraction data are considered for grading the optimization, while the ideal data $h_{id}$ deviate from the constant data of $h_0$ only in other quantities, such as the face form angle, that are ignored in A.

In another example, deriving the adapted set $h_{opt}$ of individual parameters may comprise determining the adapted set $h_{opt}$ of individual parameters as a linear function $h_{opt}(h_{id}) = bh_{id}$ of the set $h_{id}$ of individual parameters determined for the wearer, with a linearity parameter b, such that the applied measure of quality meets the identified quality grade. In particular, the linearity parameter b may be determined such that the measure of quality meets the identified quality grade. Thus, this example may be particularly represented by a proportionality:

$$h_{opt}(h_{id}) = bh_{id} \quad (12b)$$

In this example equation (10) may result in $$S = \frac{1}{2}(bh_{id} - h_{id})^T A(bh_{id} - h_{id}) \quad (13b)$$

$$= \frac{(b-1)^2}{2} h_{id}^T A h_{id}.$$

This means that for each new set of given ideal data $h_{id}$ a new optimization may be carried out. The condition b=1 would result in S=0. Due to the identity $h_{opt}(h_{id}) h_{id}$, this corresponds to an individual optimization with respect to all available parameters. In all other cases, where $b \neq 1$, the best quality S=0 is achieve only if A has a null space and $h_{id}$ is in this null space.

Yet another example may be represented by a general linearity:

$$h_{opt}(h_{id}) = Bh_{id} \quad (12c)$$

with a matix B. In this example equation (10) may result in $$S = \frac{1}{2}(Bh_{id} - h_{id})^T A(Bh_{id} - h_{id}) \quad (13c)$$

$$= \frac{1}{2}((B-1)h_{id})^T A((B-1)h_{id})$$

$$= \frac{1}{2}(h_{id}^T ((B-1)^T A(B-1) h_{id})$$

$$= \frac{1}{2} h_{id}^T A_{eff} h_{id}$$

Accordingly, this example may be treated analogous to the preceding example, when setting b=2 and replacing A by $A_{eff} \times ((B-1)^T A(B-1))$.

In yet another example, deriving the adapted set of individual parameters may comprise determining the adapted set $h_{opt}$ of individual parameters as an affine function $h_{opt}(h_{id}) = Bh_{id} + h_0$ of the set $h_{id}$ of individual parameters determined for the wearer, with a linearity matrix B and an offset vector $h_0$, such that the measure of quality meets the identified quality grade. In particular, the linearity parameter B and the offset vector $h_0$, may be determined such that the applied measure of quality meets the identified quality grade. This example is explained by means of specifically selected values for B and $h_0$ in more detail later on, wherein the linearity matrix B is defined as $B = Q \cdot 1$ and the offset vector $h_0$, is defined as $h_0 = (1-Q)h_{Standard}$ with a weighting parameter Q and a predetermined set of standard parameters $h_{Standard}$.

More generally, this example may be represented by an affine correlation:

$$h_{opt}(h_{id}) = Bh_{id} + h_0 \quad (12d)$$

In this example equation (10) may result in $$S = \frac{1}{2}(Bh_{id} + h_0 - h_{id})^T A(Bh_{id} + h_0 - h_{id}) \quad (13d)$$

In yet another example a further generalization of the example in equation (12a) may be achieved by providing a set of constant vectors $h_0^{(1)}, h_0^{(2)}, \ldots, h_0^{(N)}$ instead of only a single vector $h_0$. In one implementation, depending on the ideal data that vector $h_0^i)$ may be chosen as vector $h_{opt}$ for the optimization, which results in the desired quality among the vectors $h_0^{(1)}, h_0^{(2)}, \ldots, h_0^{(N)}$, i.e. which has the value for S that corresponds to a quality grade that is closest to the identified quality grade desired for the specific spectacle wearer. Accordingly, deriving the adapted set of individual parameters may comprise providing a set of standard vectors $h_0^{(1)}, h_0^{(2)}, \ldots, h_0^{(N)}$, wherein each standard vector may define a set of standard parameters; and selecting that vector $h_0^{(i)}$ among the set of standard vectors $h_0^{(1)}, h_0^{(2)}, \ldots, h_0^{(N)}$, as the adapted set $h_{opt}$, of individual parameters, for which the established measure of quality meets the identified quality grade best.

In particular, if the wearer wants to obtain the highest possible quality, applying equation (7) may then lead to the condition that depending on $h_{id}$ the index $k(h_{id})$ is chosen such that the quantity $g(h_0^{(k(h_{id}))} - h_{id})$ is minimal:

$$g(h_0^{(k(h_{id}))} - h_{id}) = \min \quad (14)$$

or more precisely $$g(h_0^{(k(h_{id}))} - h_{id}) = \min_{1 \leq i \leq N} g(h_0^{(i)} - h_{id}) \quad (14a)$$

For the case that the smallest resulting S-value occurs for at least two indices $k_1, k_2, \ldots k_j$, then the smallest among these indices may be chosen as index k, $$k = \min_{1 \leq i \leq j} k_i.$$

If S is applied in a general form of equation (10), then the condition of equation (14a) may result in:

$$\left(h_{opt} - h_0^{(k(h_{id}))}\right)^T A\left(h_{opt} - h_0^{(k(h_{id}))}\right) = \min_{1 \leq i \leq N} (h_{opt} - h_o^{(i)})^T A(h_{opt} - h_0^{(i)}) \quad (15)$$

The function $h_{opt}(h_{id})$ may then be represented by:

$$h_{opt}(h_{id}) = h_0^{(k(h_{id}))} \quad (12e)$$

In this example equation (10) may result in $$S = \frac{1}{2}\left(h_0^{(k(h_{id}))} - h_{id}\right)^T A\left(h_0^{(k(h_{id}))} - h_{id}\right) \quad (13e)$$

A numerical example could read as follows:

$$h_0^{(1)} = \begin{pmatrix} 0 \\ 0 \\ -10 \\ 0 \\ 0 \\ 64 \\ 13 \\ 8 \\ 0 \end{pmatrix}; \; h_0^{(2)} = \begin{pmatrix} 0 \\ 0 \\ -7 \\ 0 \\ 0 \\ 64 \\ 13 \\ 8 \\ 0 \end{pmatrix}; \; h_0^{(3)} = \begin{pmatrix} 0 \\ 0 \\ -4 \\ 0 \\ 0 \\ 64 \\ 13 \\ 8 \\ 0 \end{pmatrix}; \; h_0^{(4)} = \begin{pmatrix} 0 \\ 0 \\ -1 \\ 0 \\ 0 \\ 64 \\ 13 \\ 8 \\ 0 \end{pmatrix}; \quad (16)$$

$$h_0^{(5)} = \begin{pmatrix} 0 \\ 0 \\ +2 \\ 0 \\ 0 \\ 64 \\ 13 \\ 8 \\ 0 \end{pmatrix}; \; h_0^{(6)} = \begin{pmatrix} 0 \\ 0 \\ +5 \\ 0 \\ 0 \\ 64 \\ 13 \\ 8 \\ 0 \end{pmatrix}; \; h_0^{(7)} = \begin{pmatrix} 0 \\ 0 \\ +8 \\ 0 \\ 0 \\ 64 \\ 13 \\ 8 \\ 0 \end{pmatrix}$$

The vectors in equation (16) form a base curve system for the mean optical powers M=−10 dpt, M=−7 dpt, M=−4 dpt, M=−1 dpt, M=+2 dpt, M=+5 dpt, M=+8 dpt. Prismatic prescription and cylinder (astigmatic prescription) are not taken into account and for the individual parameters for the position of wear standard values PD=64.0 mm, HSA=13.0 mm, $\phi_x$=8.0 degree, $\phi_y$=0.0 degree are assumed.

The quadratic form of A may then be $$A = \begin{pmatrix} 0 & 0 & 0 & 0 & 0 & 0 & 0 & 0 & 0 \\ 0 & 0 & 0 & 0 & 0 & 0 & 0 & 0 & 0 \\ 0 & 0 & 1 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{pmatrix} \quad (17)$$

Thus, only deviations in the mean optical power are taken into account for the grading of the quality. Again, if the highest quality is desired, equation (15) may read:

$$\left(M_{id} - M_0^{(k(h_{id}))}\right)^2 = \min_{1 \leq i \leq N} (M_{id} - M_0^{(i)})^2, \quad (18)$$

wherein $M_0^{(i)}$ is the third component of the vectors $h_0^{(i)}$. Equation (15) leads to the index assignment function $$k(h_{id}) = \begin{cases} 1, & M_{id} \leq -8.5 \text{ dpt} \\ 2, & -8.5 \text{ dpt} < M_{id} \leq -5.5 \text{ dpt} \\ 3, & -5.5 \text{ dpt} < M_{id} \leq -2.5 \text{ dpt} \\ 4, & -2.5 \text{ dpt} < M_{id} \leq +0.5 \text{ dpt} \\ 5, & +0.5 \text{ dpt} < M_{id} \leq +3.5 \text{ dpt} \\ 6, & +3.5 \text{ dpt} < M_{id} \leq +6.5 \text{ dpt} \\ 7, & +6.5 \text{ dpt} < M_{id} \end{cases} \quad (19)$$

and, thus, to the parameter modification function $$h_{opt}(h_{id}) = \begin{cases} h_0^{(1)}, & M_{id} \leq -8.5 \text{ dpt} \\ h_0^{(2)}, & -8.5 \text{ dpt} < M_{id} \leq -5.5 \text{ dpt} \\ h_0^{(3)}, & -5.5 \text{ dpt} < M_{id} \leq -2.5 \text{ dpt} \\ h_0^{(4)}, & -2.5 \text{ dpt} < M_{id} \leq +0.5 \text{ dpt} \\ h_0^{(5)}, & +0.5 \text{ dpt} < M_{id} \leq +3.5 \text{ dpt} \\ h_0^{(6)}, & +3.5 \text{ dpt} < M_{id} \leq +6.5 \text{ dpt} \\ h_0^{(7)}, & +6.5 \text{ dpt} < M_{id} \end{cases} \quad (20)$$

The measure of quality is then given by equation (13e). In an analogous manner, if not the highest quality is desired but any other grade of quality, that vector $h_0^{(i)}$ among the vectors $h_0^{(1)}, h_0^{(2)}, \ldots, h_0^{(N)}$ may be chosen as vector $h_{opt}$ for the optimization which results in a value for S that corresponds to a quality grade that is closest to the identified quality grade desired for the specific spectacle wearer. For the case that two or more of the vectors $h_0^{(1)}, h_0^{(2)}, \ldots, h_0^{(N)}$ may result in S-values that are equally close to the desired quality, then the vector with the smallest index among their indices may be chosen as index k, $$k = \min_{1 \leq i \leq j} k_i,$$

for example.

In one aspect, a system is provided for optimizing a spectacle lens for a wearer. The system may comprise a user interface that is adapted to determine a set of individual parameters for the wearer and to identify a quality grade. The system may further comprise a computation component that is suitable to adapt the set of individual parameters depending on the identified quality grade; and to calculate a surface of the spectacle lens based on the adapted set of individual parameters. In particular, the system may be implemented to perform one or more of the methods for optimizing a spectacle lens for a wearer as described herein. Moreover, the system may be adapted also for manufacturing the spectacle lens. In this aspect, the system may comprise manufacturing tools adapted to mechanically work lens material in accordance with the calculated surface of the spectacle lens.

In another aspect, a computer-program product, particularly in a tangible implementation such as data medium or as a signal sequence, is provided for optimizing a spectacle lens for a wearer. The computer-program product may comprise or store executable program code, which when loaded and executed in a computer system causes the computer system to perform a method of optimizing (and possibly also manufacturing) a spectacle lens for a wearer, the method comprising:
- determining a set of individual parameters for the wearer;
- identifying a quality grade;
- adapting the set of individual parameters depending on the identified quality grade; and
- calculating a surface of the spectacle lens based on the adapted set of individual parameters.

In particular, the computer-program product may be implemented to cause the computer system to perform one or more of the methods for optimizing a spectacle lens for a wearer as described herein.

More details of the preferred embodiments preferred embodiments will be apparent from further examples of possible implementations as explained with reference to the drawings in the following where the following figures illustrate iso-astigmatism lines (Fig. A, respectively), iso-lines of the mean optical power (Fig. B, respectively), refractive error along the main line of vision (dashed line in Fig. C, respectively), and astigmatic error (solid line in Fig., C, respectively) of the combination of spectacle lens and eye.

BRIEF DESCRIPTION OF THE DRAWINGS

In the following, the disclosure herein will be exemplarily described with reference to the figures, which show:

FIG. 2A-2C illustrate the above cited optical properties for a fully optimized spectacle lens at individual parameters for the position of wear;

DETAILED DESCRIPTION

Possible implementations of the preferred embodiments are described by means of examples for a specific customer prescription, i.e. a specific prescription for a spectacle wearer. In the following exemplary embodiment, the spectacle wearer's prescription data may be

| sphere | 1.0 dpt, |
|---|---|
| cylinder | 3.0 dpt |
| axis | 30° |
| addition | 2.0 dpt |
| prism | 3 cm/m |
| base | 180° |

This corresponds to prismatic parameters $Pr_{hor}=-3.0$ cm/m and $Pr_{vert}=0.0$ cm/m. The individual parameters of the spectacle wearer's position of wear (and in brackets the respective standard values of the start design) in this example are:

| vertex distance | 13 mm | (13 mm) |
|---|---|---|
| interpupillary distance | 64 mm | (64 mm) |
| pantoscopic angle | 5° | (8°) |
| Face form angle | 6° | (0°) |

Figure 1B:
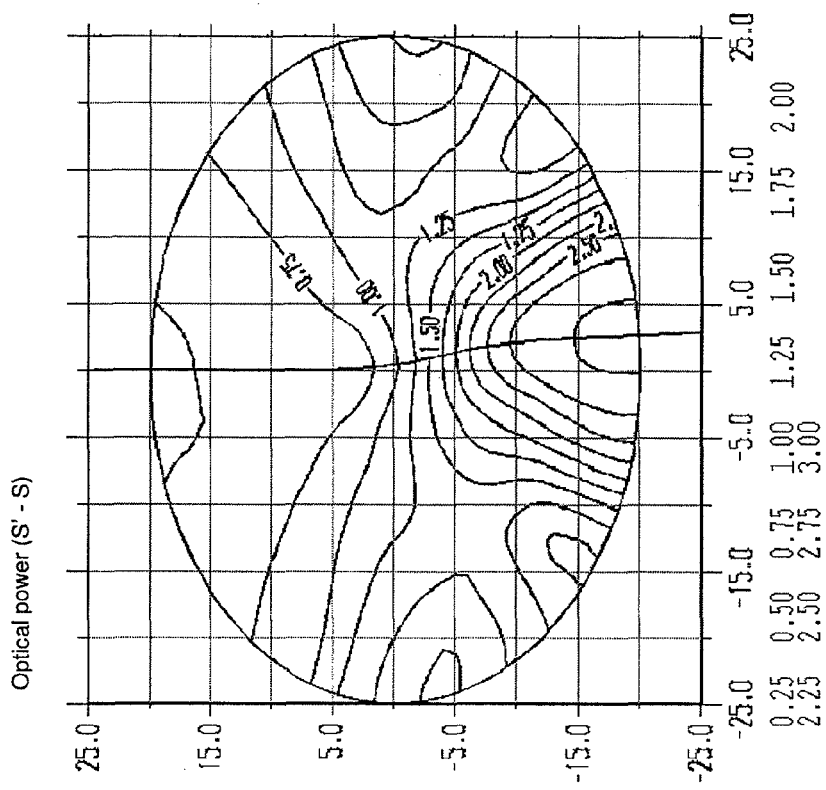
FIG. 1A-1C illustrate the above cited optical properties for a start design.
Figure 1A:
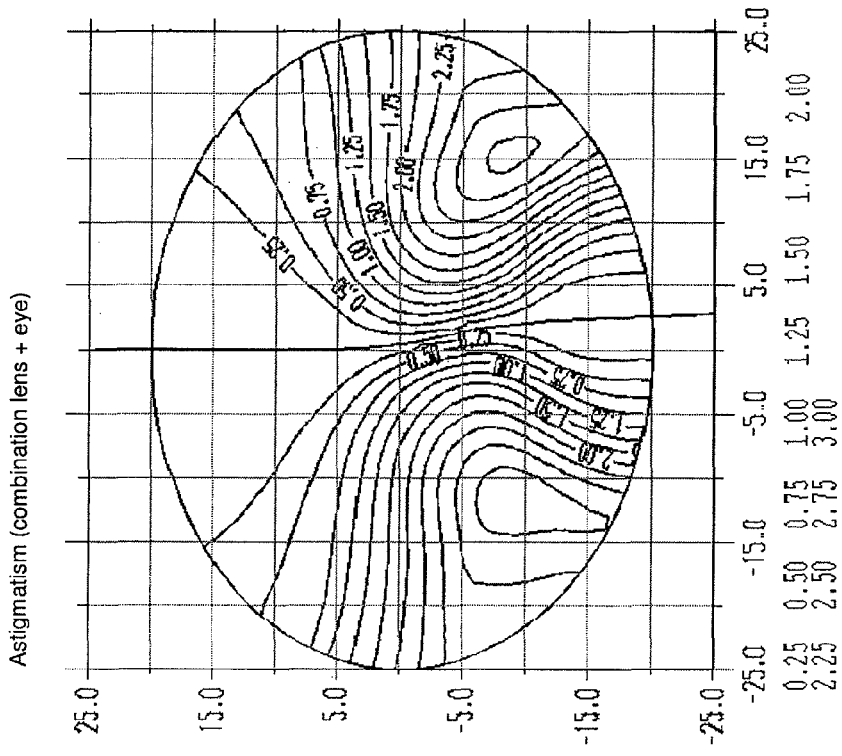
Figure 1C:
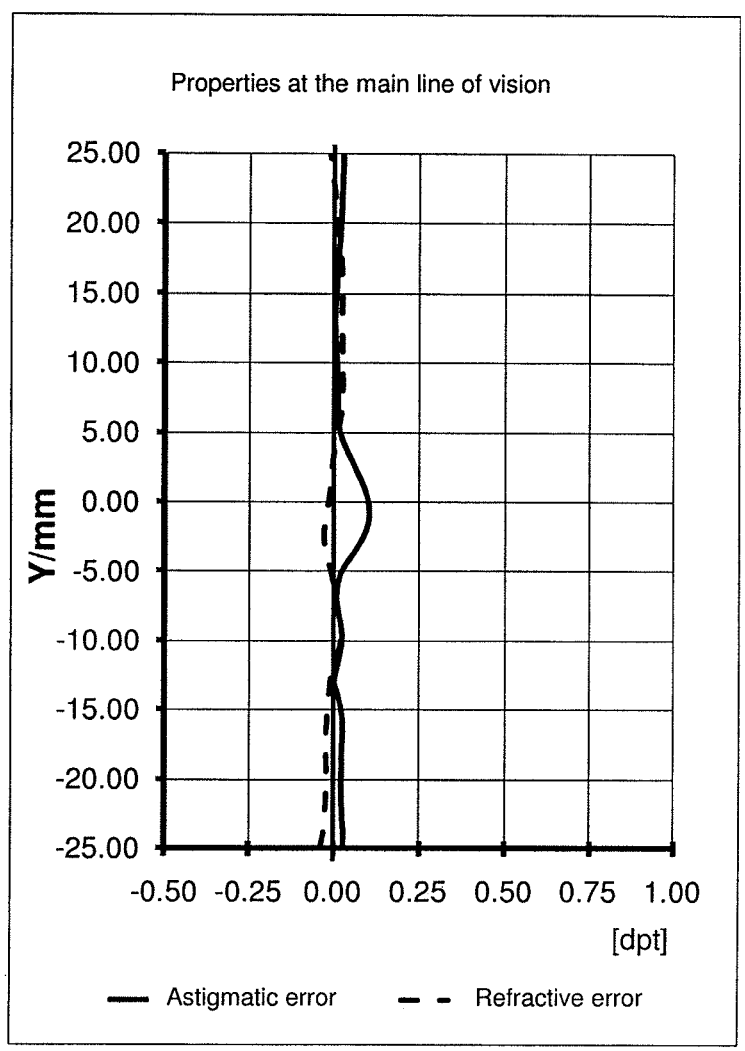
Figure 2C:
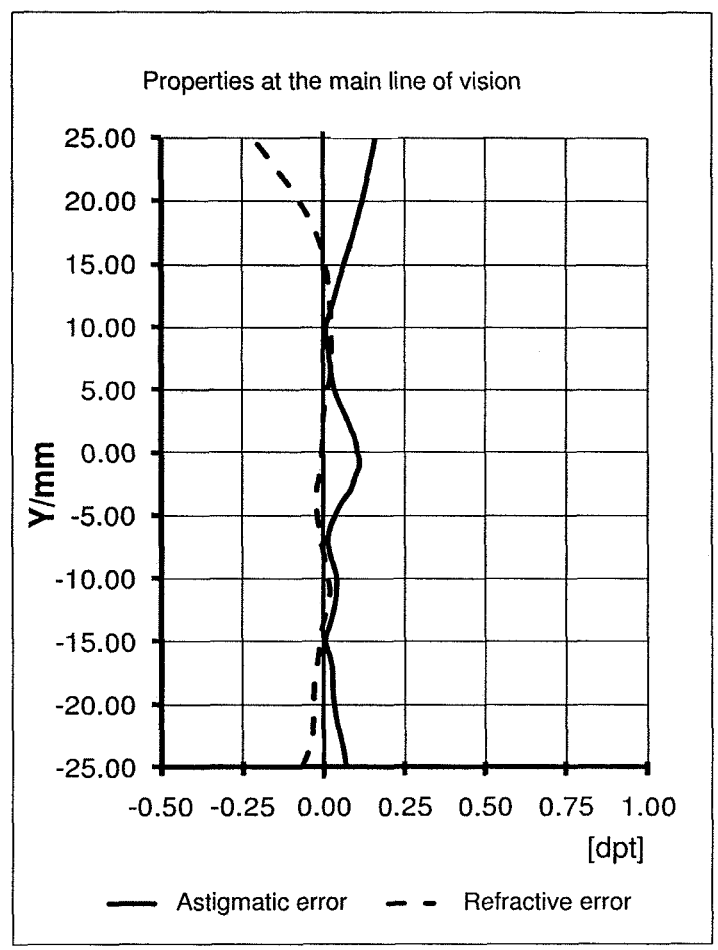

Starting from a given start design as shown in FIGS. 1A to 1C for the optical power (sphere) 0.5 dpt and the addition 2.5 dpt, a spectacle lens may be optimized using scaling of the astigmatism, for example, while all of the cited parameters of the wearer are taken into account. The result of this full optimization is shown in FIGS. 2A to 2C. This spectacle is then considered to have the highest quality and best possible correction over the entire area of the spectacle lens.

Figure 3A:
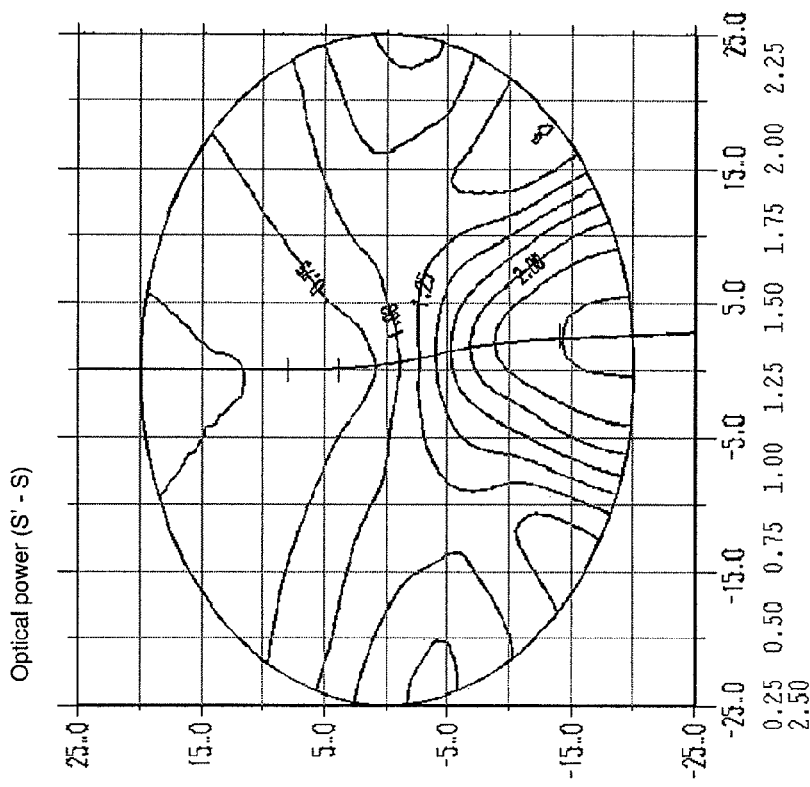
FIG. 3A-3C illustrate the above cited optical properties for a base design optimized with the start design of FIGS. 1A to 1C and with the standard parameters for the position of wear.
Figure 3B:
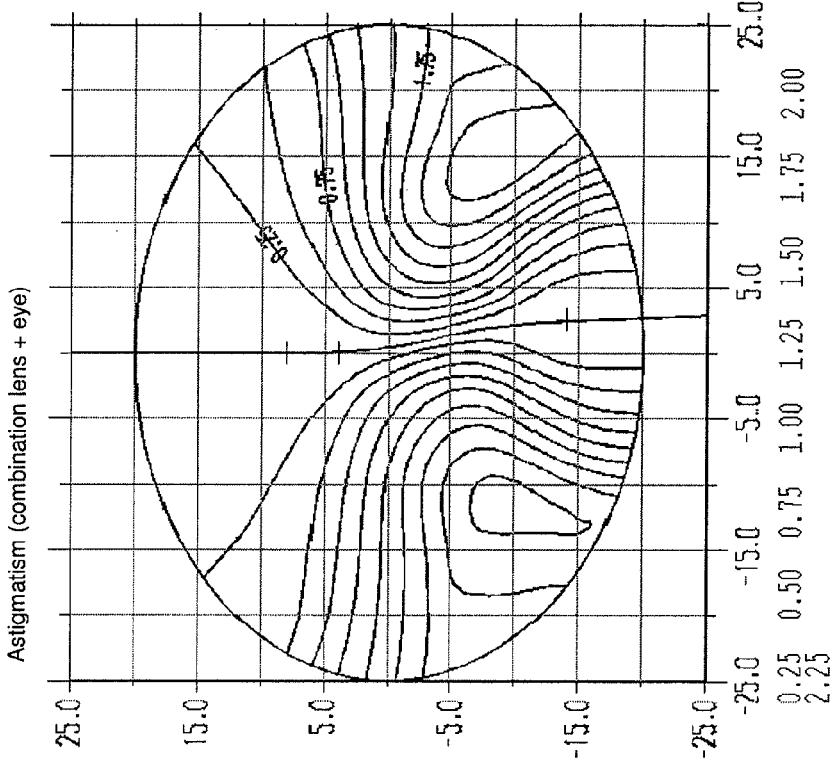
Figure 3C:
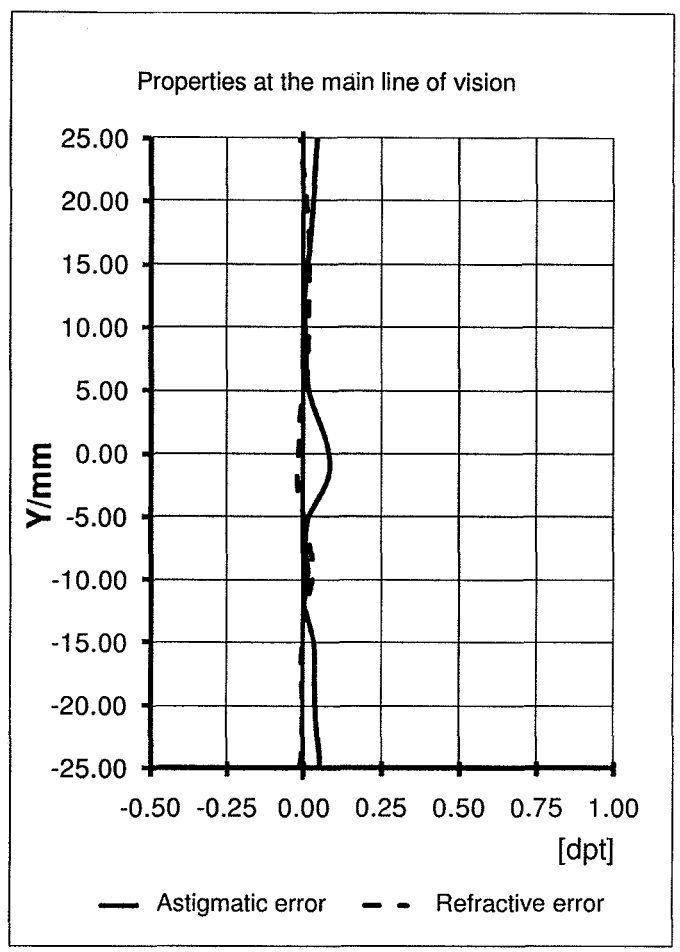
Figure 4B:
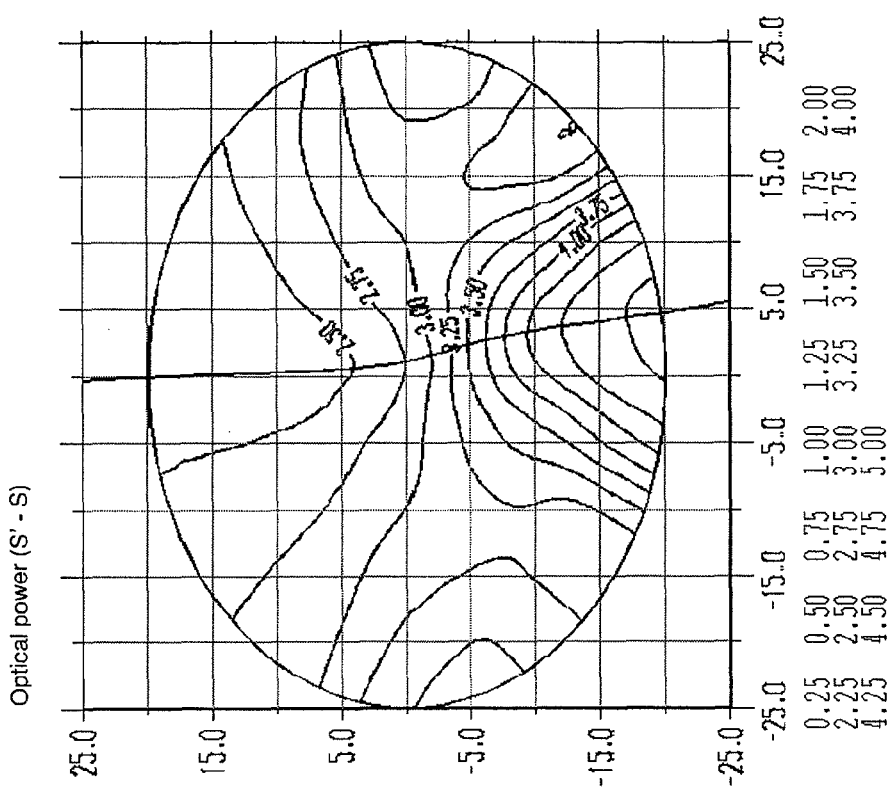
FIG. 4A-4C illustrate the above cited optical properties for a spectacle lens with a toric prescription surface being superimposed to the base design of FIGS. 3A to 3C, where the toric prescription surface was calculated with standard parameters for the position of wear.
Figure 4A:
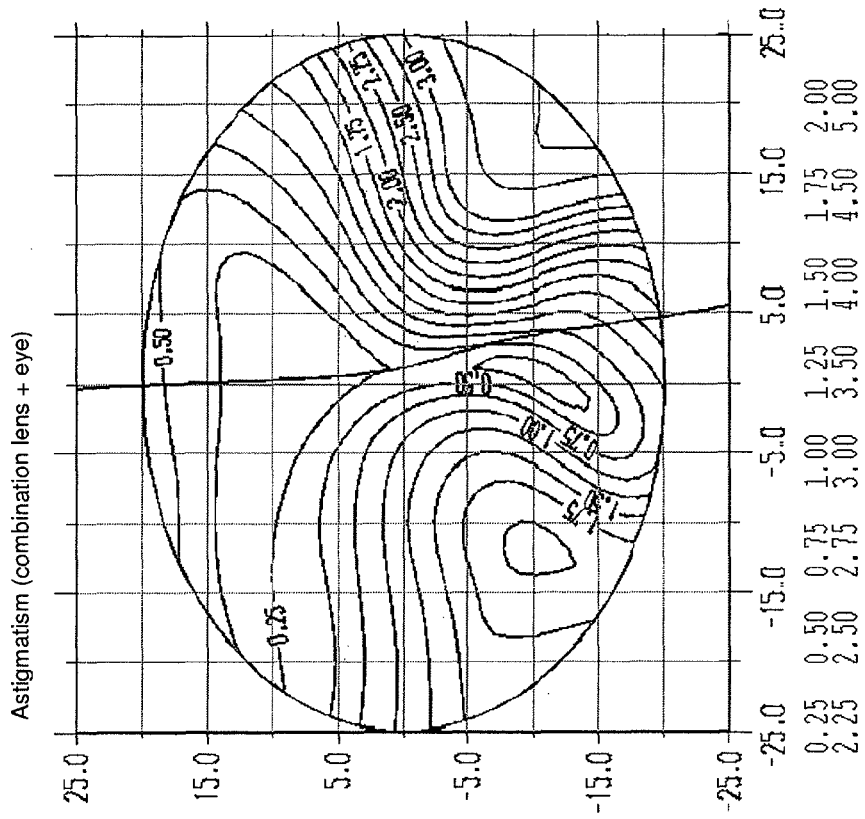
Figure 4C:
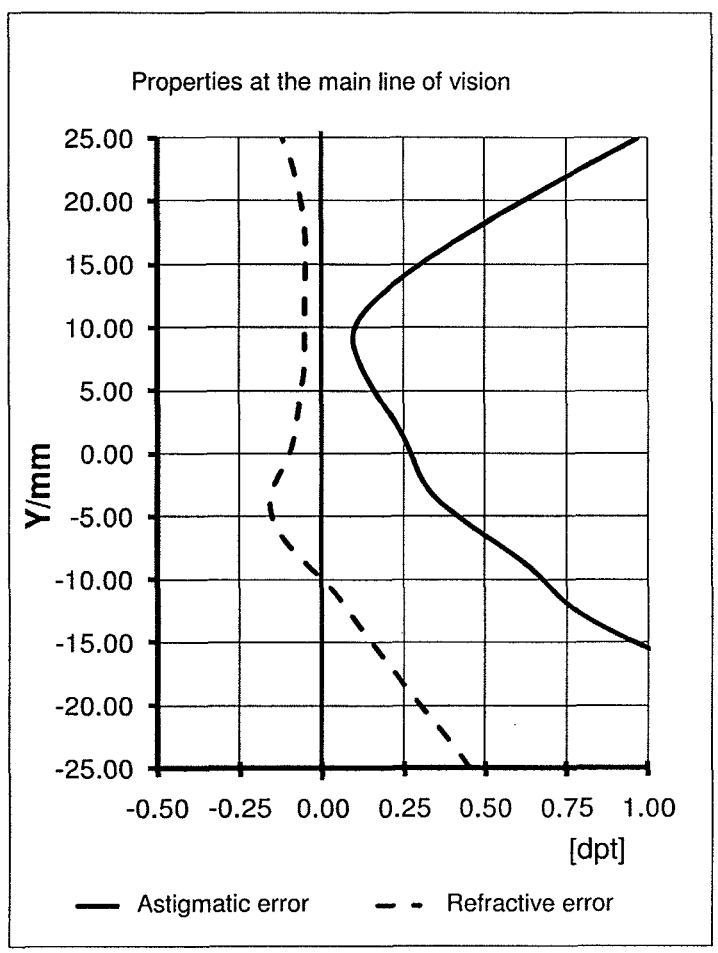

A conventional progressive addition lens with a progressive rear surface (product "Life Free") may be achieved by generating a base design (FIGS. 3A to 3C) from the start design of FIGS. 1A to 1C using the standard parameters with the sphere 0.5 dpt and the addition 2.0 dpt and superimposing a simple toric surface to the base design so that the spectacle lens meets the required wearer's prescription (particularly with respect to spherical power, astigmatism, and prism) in the far reference point and the prism reference point. In a resulting simple progressive additional lens with a progressive rear surface (FIGS. 4A to 4C) the individual parameters regarding the position of wear may be disregarded in the calculation of the toric superposition surface. In this case, predetermined standard values may be used, instead. However, this may result in a deviation of the dioptric effect of the spectacle lens even in the far reference point (FIG. 4C).

Figure 5B:
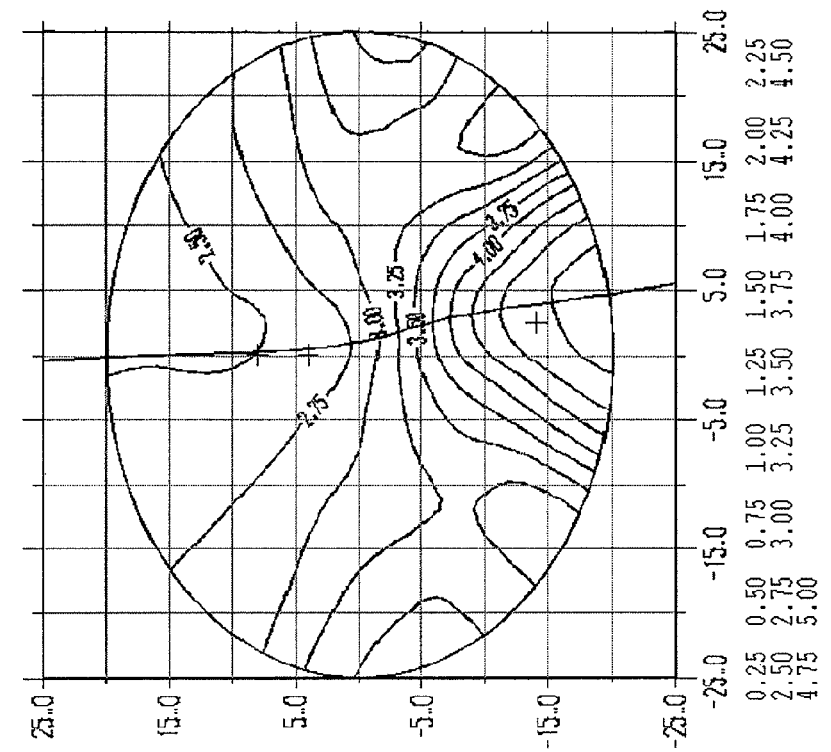
FIG. 5A-5C illustrate the above cited optical properties for a spectacle lens with a toric prescription surface being superimposed to the base design of FIGS. 3A to 3C, where the toric prescription surface was calculated with individual parameters for the position of wear.
Figure 5A:
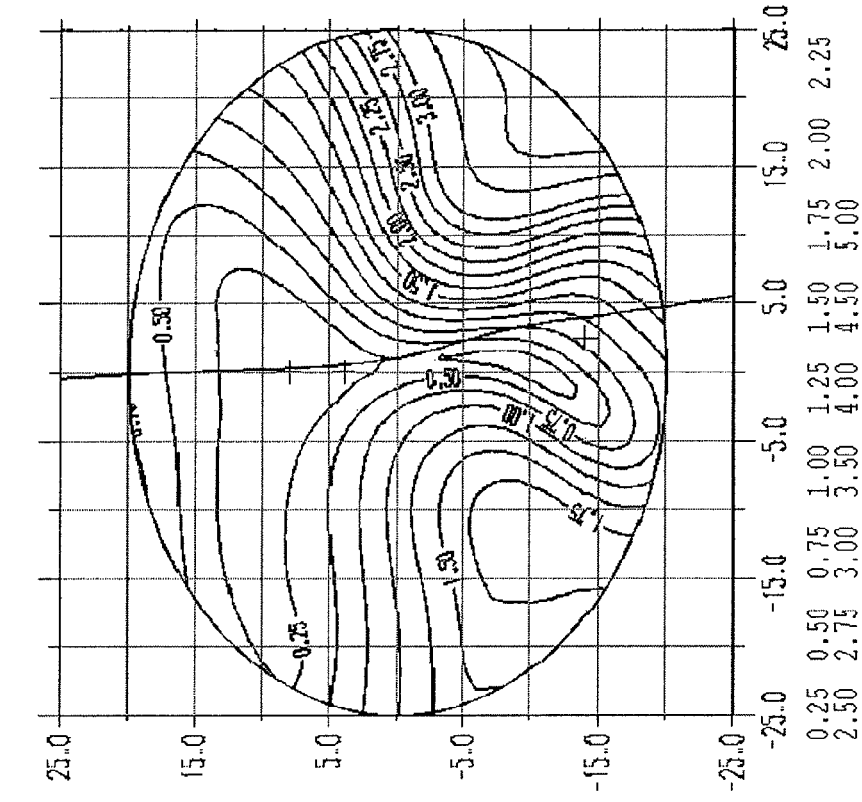
Figure 5C:
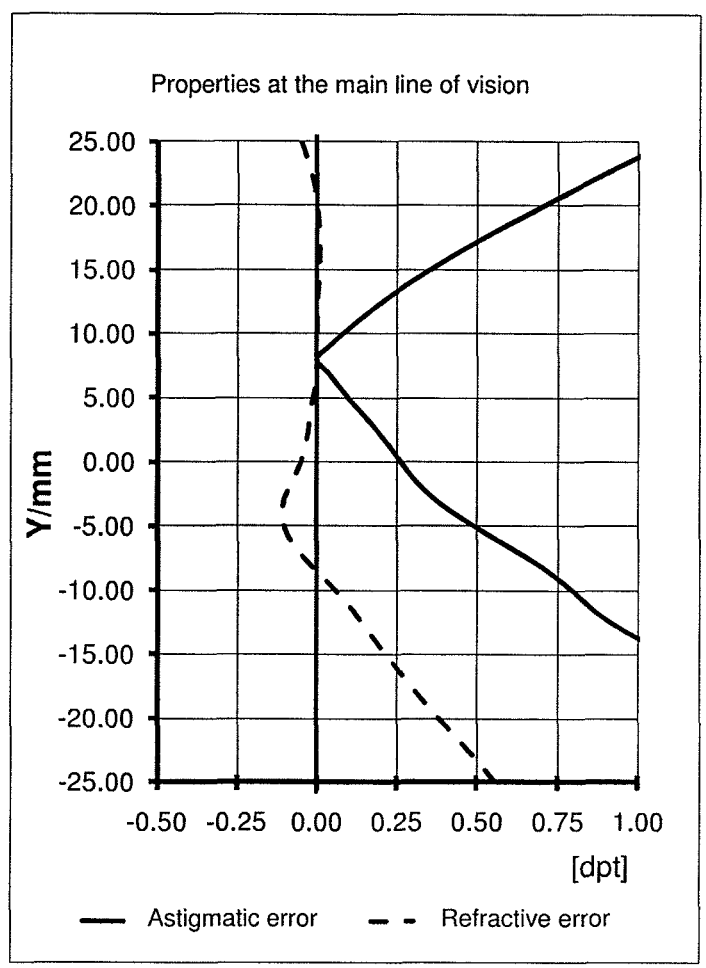
Figure 6B:
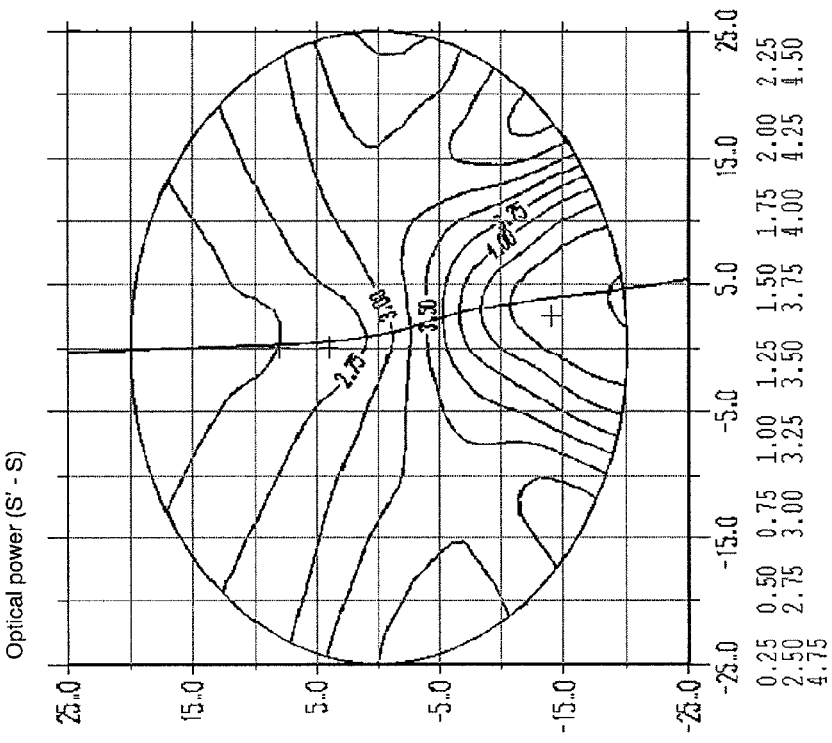
FIG. 6A-6C illustrate the above cited optical properties for an example of a spectacle lens with an intermediate grade of quality.
Figure 6A:
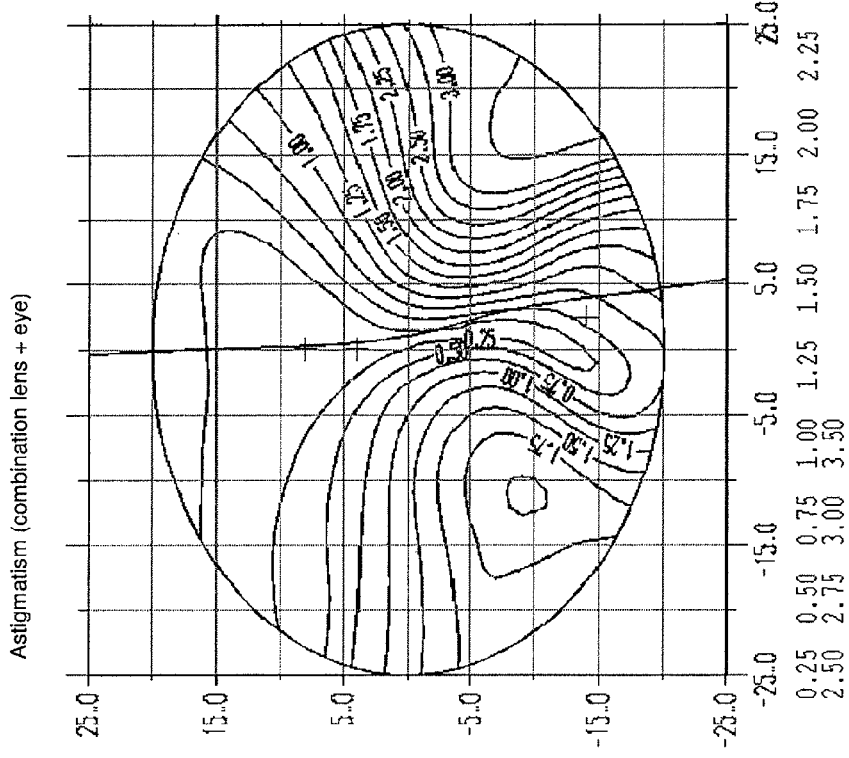
Figure 6C:
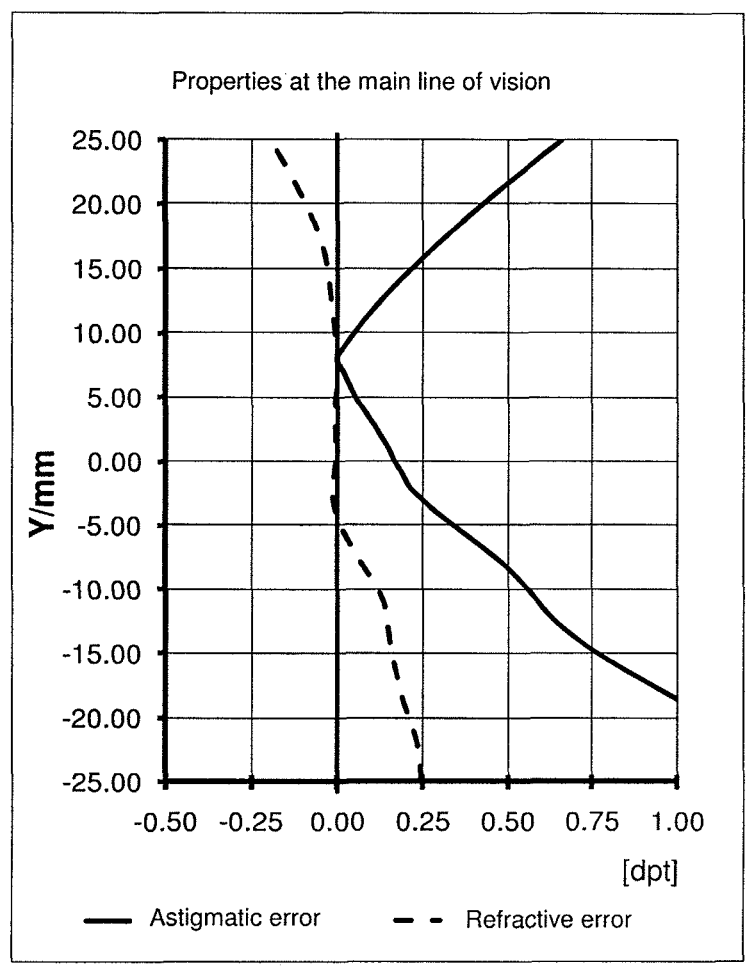
Figure 7B:
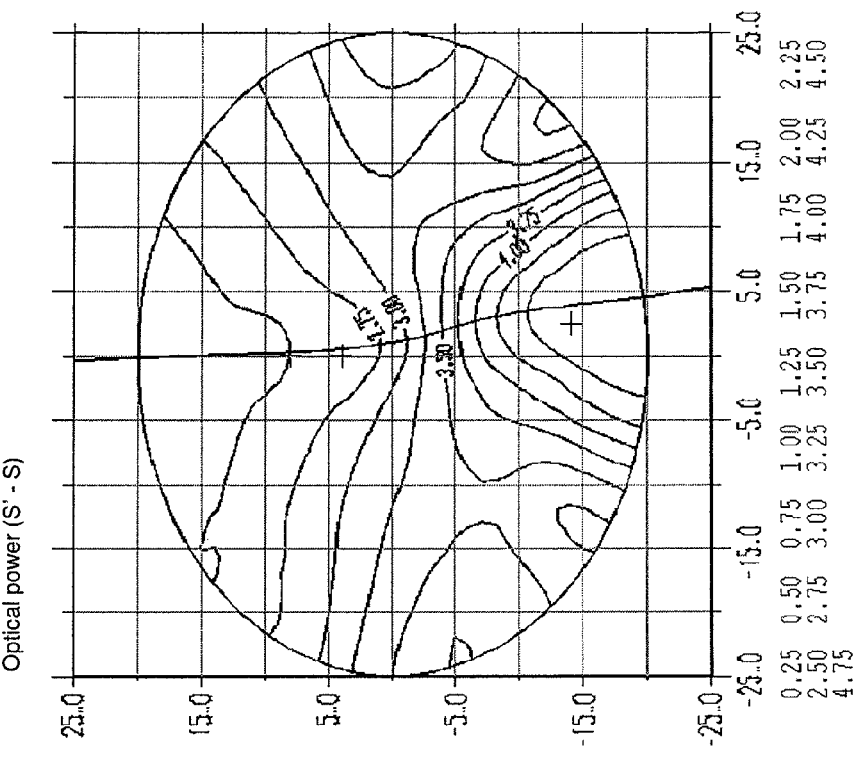
FIG. 7A-7C illustrate the above cited optical properties for another example of a spectacle lens with an intermediate grade of quality.
Figure 7A:
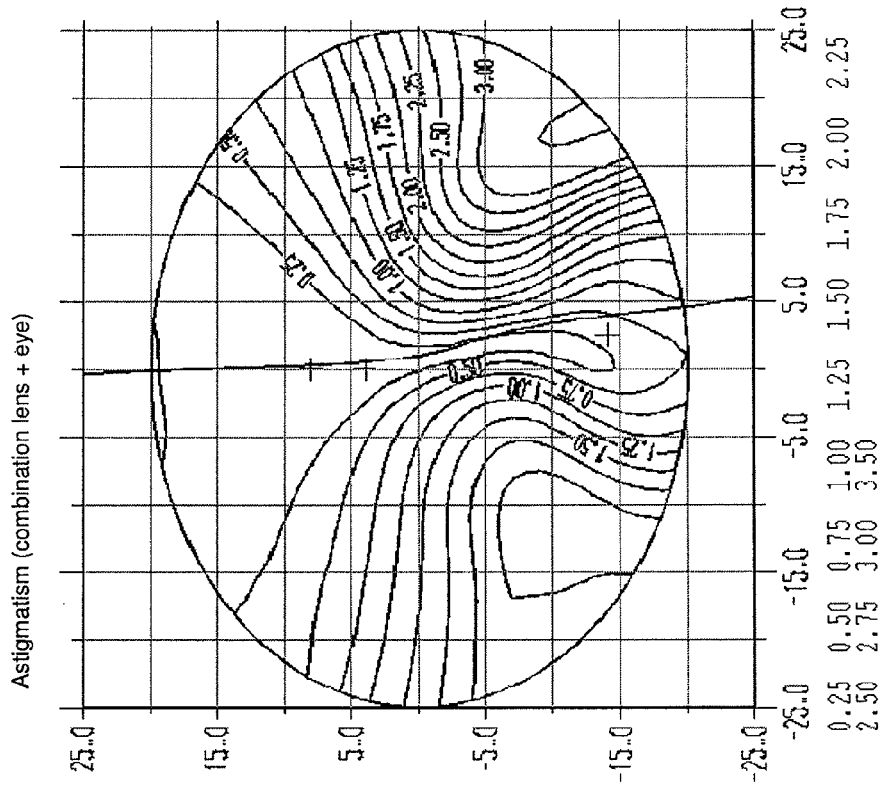
Figure 7C:
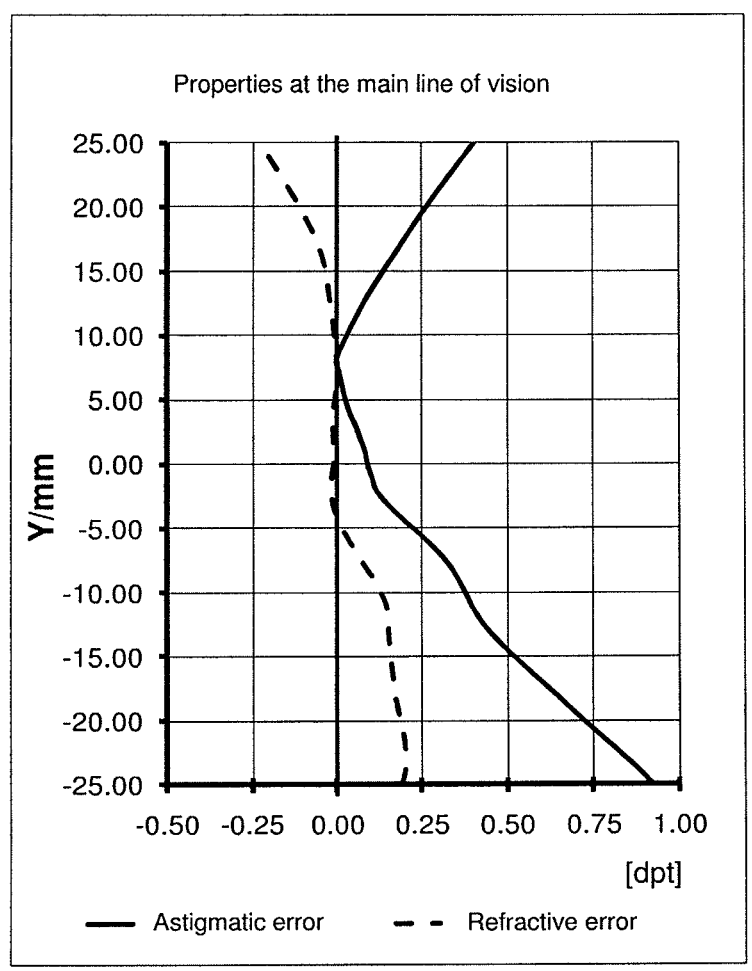

If the individual parameter with respect to the position of wear, particularly, the pantoscopic angle and/or the face form angle of the spectacle lens, are taken into account when calculating the toric superposition surface, a spectacle lens may be achieved that meets the wearer's dioptric prescription at least in the reference point (particularly the far vision reference point) in the user's specific position of wear (FIGS. 5A to 5C).

In the following, the optimization of two spectacle lenses with different grades of quality Q1 and Q2 will be explained by means of an example. Again starting from the given start design as shown in FIGS. 1A to 1C for the optical power (sphere) 0.5 dpt and the addition 2.5 dpt, an optimization process is performed with a modified set of individual parameters, that are generated depending on the desired grade of quality. Moreover, a toric superposition surface is calculated and superimposed to the optimized surface shape resulting form the optimization process.

Based on equation (4), the ideal parameters of the wearer (using equation (1) also) may be given by $$h_{id} = \begin{pmatrix} -3.0 \\ 0.0 \\ 2.5 \\ -0.75 \\ -0.75\sqrt{3} \\ 64.0 \\ 13.0 \\ 5.0 \\ 6.0 \end{pmatrix} \quad (21)$$

In one example, the modified set of individual parameters may be determined using equation (12d), $$h_{opt}(h_{id}) = Bh_{id} + h_0 \quad (12d)$$

wherein $$B = Q \cdot 1$$

$$h_{opt}(h_{id}) = Qh_{id} + (1-Q)h_{standard} \quad (22)$$

may be set, so that this results in $$h_{opt}(h_{id}) = Qh_{id} + (1-Q)h_{standard} \quad (22a)$$

Thus, this corresponds to a linear combination of the ideal data and standard data with a weighting parameter Q. For Q=1 the ideal parameters are used, while for Q=0 the standard parameters are used for the optimization process. Moreover, since Q may take any value with 0<Q<1, all intermediate levels may be achieved. In one example, a vector for the standard parameters may be $$h_{Standard} = \begin{pmatrix} 0.0 \\ 0.0 \\ 2.5 \\ 0.0 \\ 0.0 \\ 64.0 \\ 13.0 \\ 8.0 \\ 0.0 \end{pmatrix} \quad (23)$$

According to one example, the quadratic form of A may be set as $$A = 1 \quad (24)$$

Moreover, in a specific example a measure of quality may be set as $\sqrt{S}$ (equation (6)) with the measure S according to equation (13d). This results in $$\sqrt{S} = \sqrt{\frac{1}{2}(Bh_{id} + h_0 - h_{id})^T A(Bh_{id} + h_0 - h_{id})} \quad (25)$$

$$= \sqrt{\frac{1}{2}((1-Q)(h_{Standard} - h_{id}))^T ((1-Q)(h_{Standard} - h_{id}))}$$

$$= \frac{1}{\sqrt{2}}(1-Q)|h_{Standard} - h_{id}|$$

$$\approx 5.3033 \times (1-Q),$$

so that measure of quality is proportional to $(1-Q)$.

Accordingly, in this example the adapted set of individual parameters comprises determining the adapted set $h_{opt}$ of individual parameters as an affine function $h_{opt}(h_{id})=Bh_{id}+h_0$ of the set $h_{id}$ of individual parameters determined for the wearer, with a linearity matrix B and an offset vector $h_0$, wherein the linearity matrix B is defined as $B=Q\cdot1$ and the offset vector $h_0$ is defined as $h_0=(1-Q)h_{Standard}$ with a weighting parameter Q and a predetermined set of standard parameters $h_{Standard}$. Deriving the adapted set $h_{opt}$ of individual parameters may comprise determining the weighting parameter Q such that the applied measure of quality meets the identified quality grade. In general, specifying the quality grade by a user and entering the quality grade to an optimization system is not limited to specific format for defining the quality grade. A definition of the quality grade may be provided by the user in the form of a value for the measure of quality, such as S or $\sqrt{S}$, for example. Alternatively, the definition of the quality grade may be provided by the user in the form of the weighting parameter Q, for example. Any other quantity may be applied that has a well-defined relation to the measure of quantity.

In the following, the optimization has been explicitly carried out for $Q=Q_1=\frac{1}{3}$, for $Q=Q_2=\frac{2}{3}$, as well as for the ideal parameters ($Q=Q_3=1$). Theses values for Q correspond to the following respective modified sets of individual parameters for the first step of optimization.

|  | (Q = Q₃ = 1) | Q = Q₁ = ⅓ | Q = Q₂ = ⅔ |
|---|---|---|---|
| Pr_hor | −3.0 | −1.0 | −2.0 |
| Pr_vert | 0.0 | 0.0 | 0.0 |
| sphere | 1.0 | 2.0 | 1.5 |
| cylinder | 3.0 | 1.0 | 2.0 |
| axis | 30° | 30° | 30° |
| Interpupillary distance | 64 | 64 | 64 |
| Vertex distance | 13 | 13 | 13 |
| Pandoscopic angle | 5 | 7 | 6 |
| Face form angle | 6 | 2 | 4 |

As illustrated in FIGS. 6A to 6C and FIGS. 7A to 7C, any arbitrary intermediate level of quality can be achieved with respect to the quality of image formation and the deviations in the near vision reference point (Y=−14 mm), for example. The following table summarizes the actual values in the near vision reference point.

|  | Life free | Q3 | Q1 | Q2 |
|---|---|---|---|---|
| astigmatic abberation | 0.88 | 1.02 | 0.71 | 0.48 |
| Mean optical power $S_{ON}$ | 4.62 | 4.69 | 4.65 | 4.65 |
| effective addition $S_{ON}-S_{Oprescription}$ | 2.12 | 2.19 | 2.15 | 2.15 |

It should be understood that while the foregoing has been described in conjunction with an exemplary embodiment, it is understood that the term "preferred" is merely meant as an example. Accordingly, the disclosure herein is intended to cover alternatives, modifications and equivalents, which may be included within the spirit and scope of the disclosed system and method.

Additionally, in the preceding detailed description, numerous specific details have been set forth in order to provide a thorough understanding of the present disclosure. However, it should be apparent to one of ordinary skill in the art that the embodiments described herein may be practiced without these specific details. In other instances, well-known methods, procedures and components have not been described in detail so as not to unnecessarily obscure aspects of the disclosure herein.

What is claimed is:

1. A method implemented by a computer system for optimizing a spectacle lens for a wearer, the method comprising:
   determining a set of individual parameters for the wearer, wherein the individual parameters comprise individual prescription data and/or individual user preference data;
   identifying a quality grade of a plurality of quality grades of the spectacle lens;
   adapting the set of individual parameters depending on the identified quality grade, wherein the adapting step comprises:
      establishing a measure of quality based on a deviation of the adapted set of individual parameters from the set of individual parameters determined for the wearer; and
      deriving the adapted set of individual parameters such that the measure of quality meets the identified quality grade; and
   calculating a surface of the spectacle lens based on the adapted set of individual parameters.

2. The method of claim 1, wherein the calculating step comprises:
   optimizing a surface shape by minimizing a target function based on the adapted set of individual parameters; and
   superimposing a prescription surface and the optimized surface shape, wherein the spectacle lens meets the wearer's prescription in at least one reference point of the spectacle lens.

3. The method of claim 2, wherein the superimposed prescription surface is provided as a toric surface.

4. The method of claim 1, wherein the determined set of individual parameters is selected from the group consisting of individual prismatic prescription data, individual spherical prescription data, individual astigmatic prescription data, an individual interpupillary distance, an individual vertex distance, an individual pantoscopic angle, and an individual face form angle.

5. The method of claim 1, wherein the measure of quality S is established as a continuous function $S=g(h_{opt}-h_{id})$ of the difference $(h_{opt}-h_{id})$ between the adapted set of parameters and the set of parameters determined for the wearer.

6. The method of claim 5, wherein the measure of quality is established as $$S = \frac{1}{2}(h_{opt}-h_{id})^T A(h_{opt}-h_{id})$$

wherein $$A_{ij} = \left.\frac{\partial^2 g}{\partial h_i \partial h_j}\right|_{h=0}$$

is the Hessian of the continuous function $S=g(h_{opt}-h_{id})$.

7. The method of claim 5, wherein the set of individual parameters comprises the components of the power vector $$\begin{pmatrix} M \\ J_0 \\ J_{45} \end{pmatrix} = \begin{pmatrix} S + \frac{Z}{2} \\ -\frac{Z}{2}\cos 2A \\ -\frac{Z}{2}\sin 2A \end{pmatrix}$$

defined for the sphere S, the cylinder Z, and cylinder axis A, and wherein the applied measure of quality is proportional to $[(M_{opt}-M_{id})^2+(J_{0,opt}-J_{0,id})^2+(J_{45,opt}-J_{45,id})^2]$.

8. The method of claim 5, wherein the set of individual parameters comprises a horizontal prism component $Pr_x$ and a vertical prism component $Pr_y$, and wherein the applied measure of quality is proportional to $[(Pr_{x,opt}-Pr_{x,id})^2+(Pr_{y,opt}-Pr_{y,id})^2]$.

9. The method of claim 5, wherein the set of individual parameters comprises a pantoscopic angle $\phi_x$ and a face form angle $\phi_y$, and wherein the applied measure of quality is proportional to $[w_x\cdot(\phi_{x,opt}-\phi_{x,id})^2+w_y\cdot(\phi_{y,opt}-\phi_{y,id})^2]$ with weighting parameters $w_x$ and $w_y$.

10. The method of claim 5, wherein the set of individual parameters comprises a mean optical power $$M = S + \frac{Z}{2}$$

defined for the sphere S and the cylinder Z, a pantoscopic angle $\phi_x$, and a face form angle $\phi_y$ and wherein the applied measure of quality is proportional to $$\left[w_{MM}\cdot\left(\frac{M_{opt}-M_{id}}{dpt}\right)^2 + w_{\varphi\varphi}\cdot\left(\frac{\varphi_{y,opt}-\varphi_{y,id}}{degree}\right)^2 + w_{M\varphi}\cdot\left(\frac{M_{opt}-M_{id}}{dpt}\right)\left(\frac{\varphi_{y,opt}-\varphi_{y,id}}{degree}\right)\right]$$

with weighting parameters $w_{MM}$, $w_{\varphi\varphi}$, and $w_{M\varphi}$.

11. The method of claim 1, wherein the deriving step comprises determining the adapted set $h_{opt}$ of individual parameters as a linear function $h_{opt}(h_{id})=bh_{id}$ of the set $h_{id}$ of individual parameters determined for the wearer, with a linearity parameter b.

12. The method of claim 1, wherein the deriving step comprises determining the adapted set $h_{opt}$ of individual parameters as an affine function $h_{opt}(h_{id})=Bh_{id}+h_0$ of the set $h_{id}$ of individual parameters determined for the wearer, with a linearity matrix B and an offset vector $h_0$.

13. The method of claim 12, wherein the linearity matrix B is defined as $B=Q\cdot 1$ and the offset vector $h_0$ is defined as $h_0=(1-Q)h_{Standard}$ with a weighting parameter Q and a predetermined set of standard parameters $h_{Standard}$.

14. The method of claim 1, wherein the deriving step comprises:
provides a set of standard vectors $h_0^{(1)}, h_0^{(2)}, \ldots, h_0^{(N)}$; and
selecting that vector $h_0^{(i)}$ among the set of standard vectors $h_0^{(1)}, h_0^{(2)}, \ldots, h_0^{(N)}$ as the adapted set $h_{opt}$ individual parameters, for which the established measure of quality meets the identified quality grade best.

15. A computer system for optimizing a spectacle lens for a wearer, the system comprising:
a user interface configured to determine a set of individual parameters for the wearer and to identify a quality grade of a plurality of quality grades of the spectacle lens, wherein the individual parameters comprise individual prescription data and/or individual user preference data; and
an adapter configured to adapt the set of individual parameters depending on the identified quality grade by establishing a measure of quality based on a deviation of the adapted set of individual parameters from the set of individual parameters determined for the wearer, and deriving the adapted set of individual parameters such that the measure of quality meets the identified quality grade, and to calculate a surface of the spectacle lens based on the adapted set of individual parameters.

16. The computer system of claim 15, further comprising manufacturing tools adapted to mechanically adjust lens material in accordance with the calculated surface of the spectacle lens.

17. A computer-program product stored on a non-transitory computer readable medium comprising executable program code, which when loaded and executed in computer system causes the computer system to:
determine a set of individual parameters for the wearer, wherein the individual parameters comprise individual prescription data and/or individual user preference data;
identify a quality grade of a plurality of quality grades of the spectacle lens;
adapt the set of individual parameters depending on the identified quality grade by establishing a measure of quality based on a deviation of the adapted set of individual parameters from the set of individual parameters determined for the wearer, and deriving the adapted set of individual parameters such that the measure of quality meets the identified quality grade; and
calculate a surface of the spectacle lens based on the adapted set of individual parameters.

18. A method of manufacturing a spectacle lens, the method comprising:
optimizing the spectacle lens using the method according to claim 1; and
manufacturing the spectacle lens,
wherein the method is implemented by the computer system.

* * * * *